Figure 4A:
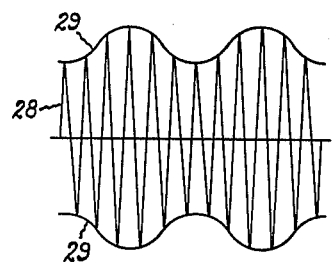

June 11, 1940.  A. V. MERSHON  2,204,425
VIBRATION INDICATOR
Filed Jan. 2, 1937   3 Sheets-Sheet 1
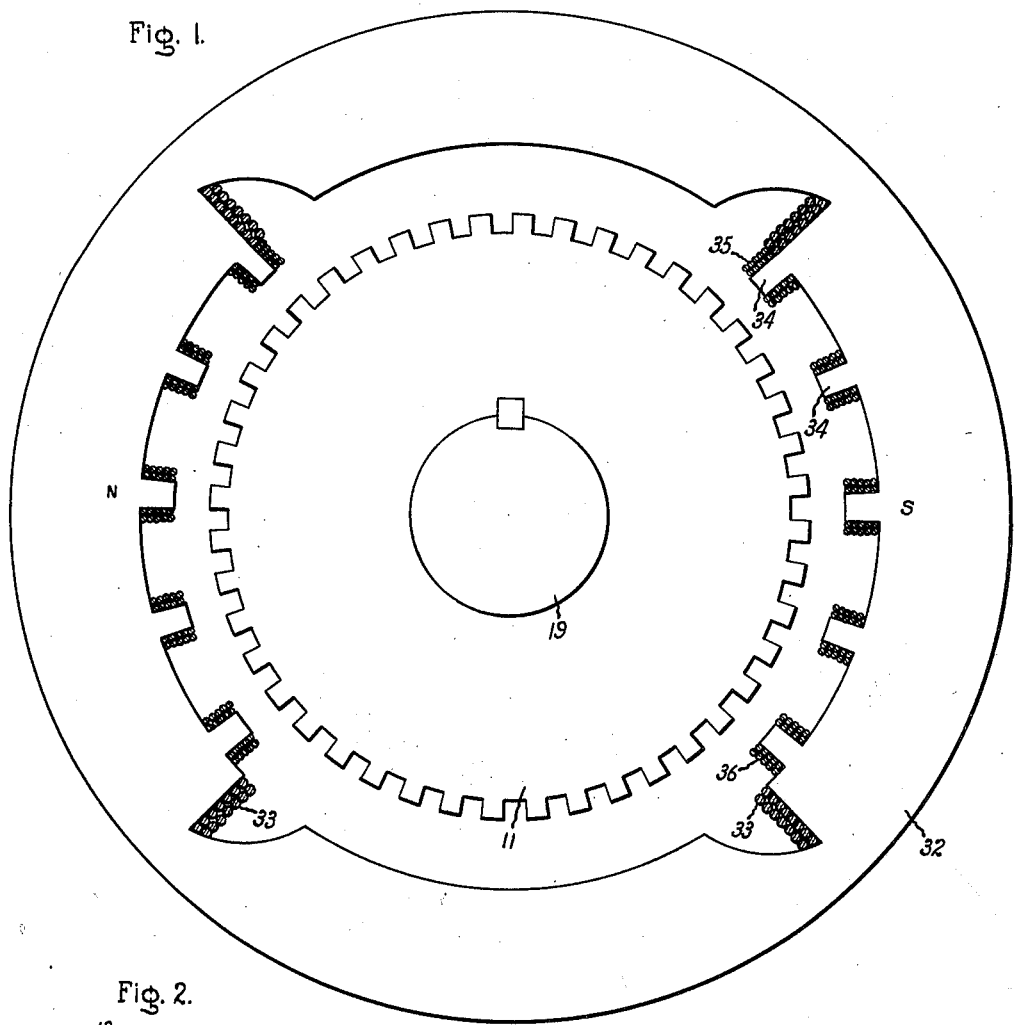
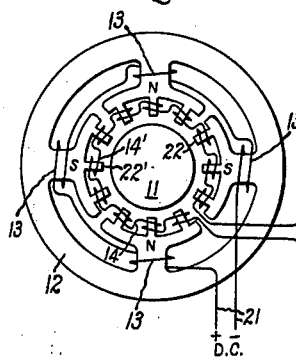
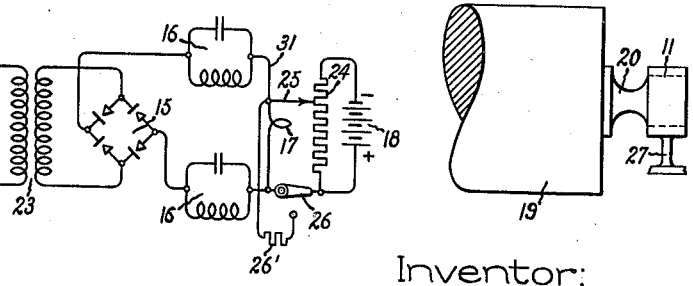
Inventor:
Alfred V. Mershon,
by Harry E. Dunham
His Attorney.

Inventor:
Alfred V. Mershon,
by Harry E. Dunham
His Attorney.

June 11, 1940.  A. V. MERSHON  2,204,425
VIBRATION INDICATOR
Filed Jan. 2, 1937   3 Sheets-Sheet 3

Inventor:
Alfred V. Mershon,
by Harry E. Dunham
His Attorney.

Patented June 11, 1940

2,204,425

UNITED STATES PATENT OFFICE 2,204,425

VIBRATION INDICATOR

Alfred V. Mershon, Schenectady, N. Y., assignor to General Electric Company, a corporation of New York Application January 2, 1937, Serial No. 118,893

8 Claims. (Cl. 73—51)

My invention relates to apparatus for measuring vibration and eccentricity. The invention concerns particularly measuring apparatus for use with vibrating and rotating bodies.

When starting steam turbines, particularly large turbines used in electric central stations, it is necessary to employ great care to avoid damaging the blades or other parts of the turbine. After the turbine has been left standing for a certain length of time, there is a tendency for the shaft or other parts to acquire a set which prevents the turbine from rotating true and throws it out of balance when it is started. Uneven heating as the steam is admitted for starting also results in uneven expansion and lack of symmetry and balance of the rotor of the turbine. In order to prevent damage to the turbine, it is customary to start it very slowly to allow the sets to work out and to permit all parts of the turbine to become evenly heated. Without means for determining when the shaft has begun to rotate uniformly, it is necessary for the sake of safety to make the starting period longer than would otherwise be required. The measurement is made more difficult by reason of the fact that the shaft may ride up in the bearing to a different average position as well as varying cyclically from this average position, owing to the rotation of the shaft.

It is an object of my invention, therefore, to provide a simple, rugged, easily constructed apparatus for measuring the shaft eccentricity during the starting of the turbine and for shortening the time required for safely bringing a turbine up to speed.

It is also an object of my invention to provide an apparatus for measuring shaft eccentricity which is unaffected by comparatively slow transverse shift or displacement of a shaft as distinguished from the cyclical displacement due to the eccentricity.

Still another object is the measurement of eccentricity and average displacement independently.

Still another object is the measurement of the eccentricity or the vibration of any rotating body where the average displacement of the body with respect to a datum does not remain constant.

In carrying out my invention in its preferred form, a toothed rotor is mounted on a rotatable shaft or other part, the eccentricity of which is to be measured, and a stator with suitable exciting and inducing windings is placed in inductive relation to the rotor upon an independent stationary support. Transverse shifting of the shaft in its bearings results in variations in the length of the air gap of the induction generator thus formed at any given point in the stator. Such gap variations, in turn, give rise to variations in induced current. The current induced in the inducing windings is rectified and filtered to produce a modulated current having components representing the average shift and the eccentricity of the rotating shaft. The average value of the modulated current is measured to determine the average shaft shift, and the alternating-current component of the current is measured to determine the eccentricity of the shaft.

Figure 8:
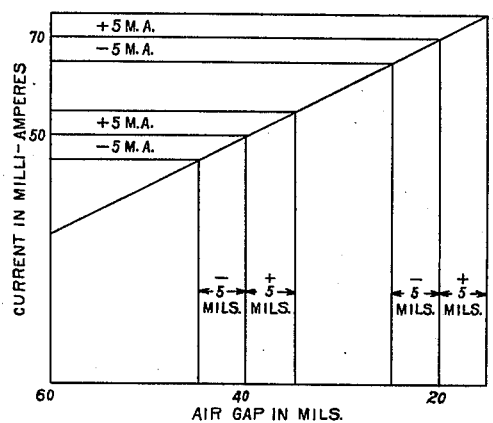
Figure 9:
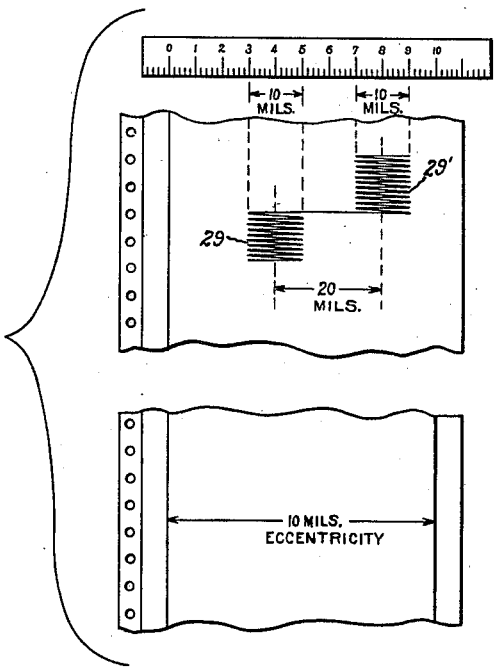

The invention may be understood more readily from the following detailed description when considered in connection with the accompanying drawings and those features of the invention which are believed to be novel and patentable will be pointed out in the claims appended hereto. In the drawings, Fig. 1 is a diagram, partially in section, showing one form of induction generator which may be used in carrying out my invention; Fig. 2 is a circuit diagram of one embodiment of my invention including a modified form of induction generator; Fig. 3 is a fragmentary side view of a shaft schematically illustrating the method of mounting the apparatus of Figs. 1 and 2; Figs. 4a, 4b, 5a, 5b, 6a, 6b, 7a, and 7b are graphs showing the current magnitude at various portions of the apparatus; Fig. 8 is a graph illustrating the relationship between the current in the inducing windings and the air gap; and Fig. 9 is a copy of a record chart illustrating a record which may be obtained with the apparatus. Like reference characters are utilized throughout the drawings to designate like parts.

The arrangement shown by way of illustration in Fig. 2 of the drawings consists of a toothed rotor 11 (see Fig. 1 for rotor tooth structure) secured to a rotating body, the eccentricity of which is to be determined, a stator 12 with a direct current exciting winding 13, a voltage generating or inducing winding 14 consisting of one or more coils, a rectifier 15 for converting the current induced in the winding 14 into unidirectional current, means, such as filters 16, for smoothing out tooth frequency pulsations in the current, a current-responsive device 17, and an arrangement, such as a blocking condenser or a source of blocking voltage 18, for eliminating the direct current component of current representing shaft shift.

The eccentricity-responsive unit comprising the rotor 11, the stator 12, and the generating or detector windings 14 may take various forms and may either be magnetized by an exciting winding or by utilizing permanent magnet material for some part of the magnetic circuit so as to subject the parts of the stator to unidirectional magnetization and to produce unidirectional flux therein. The rotor 11 which is illustrated in larger scale in Fig. 1 is toothed, preferably having a relatively large number of teeth, so as to induce currents in the inducing windings having a frequency which is high in comparison with the speed of rotation of the rotor 11. It will be observed that the opening in the stator for the rotor 11 is of such size as to allow considerable lateral displacement of the rotor and that the air gap between stator and rotor is great in comparison with air gaps usually provided in good generator design. The rotor 11 may be mounted directly upon a body, such as a shaft 19, the eccentricity of which is to be determined, or, in case of relatively large shafts such as turbine shafts, the rotor 11 may be secured by means of a suitable stub 20 to the end of the rotating shaft as illustrated in Fig. 3.

The stator may consist of one or more magnetized pole pieces carrying one or more coils so positioned as to have current induced therein by the motion of the toothed rotor across the face of the pole piece. If desired, the generating coils 14 may be mounted around the periphery of the stator, as shown in Fig. 2. In the arrangement of Fig. 2, a four-pole stator is provided having a magnetizing winding 13 energized by a source of direct current 21. Teeth 22 are provided on the pole pieces of the stator 12 to carry the coils forming the voltage generating winding 14. The stator 12 is mounted in any suitable manner as by means of a bracket 27 which is supported independently of the apparatus including the shaft 19 so as to be relatively stationary and furnish a basis of reference for the motion of the shaft 19.

The coils of the stator winding 14 are connected in series with the primary winding of a transformer 23 provided for transforming the voltage to a suitable value for operation of a current-responsive instrument. The secondary winding of the transformer 23 is connected to a rectifier, preferably a full-wave rectifier 15, which may be of the dry or copper oxide type. The output side of the rectifier 15 is connected to the current-responsive device 17 in series with the filters 16, which are preferably so designed as to pass any currents of the frequency corresponding to the speed of rotation of the rotor 11 but to cut off frequencies corresponding to the tooth frequency of the rotor 11, namely, the frequency corresponding to the product of its speed times the number of teeth. The filters 16 are preferably of a type giving a constant current output.

The current-responsive device 17 may take the form of an oscillograph or an alternating-current indicating or recording instrument, a telemeter transmitter, a relay, or any other suitable apparatus acting in accordance with current magnitude and responsive to alternating current.

The blocking voltage 18, which may consist of a battery, is preferably applied through a potentiometer consisting of a resistor 24 connected across the battery 18 and a tap 25 to permit proper adjustment for obtaining a current through the current-responsive device 17 exactly equaling the average value of the current resulting from the rotation of the rotor 11. For eliminating the effect of the blocking voltage 18 when desired, a switch 26 is preferably provided to permit opening the circuit between the potentiometer 24, 25 and the current-responsive device 17. If desired, the switch 26 may be a double-throw switch, and a shunt 26' may be provided for decreasing the sensitivity of the current-responsive device 17 when it is disconnected from the potentiometer 24, 25 by the switch 26.

The principle of operation of the apparatus may be perceived most readily by considering the action taking place within one of the coils 14' of the generating winding 14, mounted upon one of the teeth 22' of the stator 12, and assuming that the coil 14' alone is connected to the transformer 23. When the rotor 11 is running perfectly true without vibration in the center of the stator 12 or, in case the stator consists only of a single pole piece, in fixed relation thereto, an alternating current of tooth frequency will be induced in the coil 14' and transformed to an equivalent current of convenient magnitude by the transformer 23. This current will be rectified by the rectifier 15 and smoothed by the filter 16 to produce a direct current flowing in the current-responsive device 17. If the switch 26 is closed in the position shown and the tap 25 is set at a suitable value, such current may be eliminated from the device 17. In case the shaft 11 shifts in its bearing so as to move the rotor 11 transversely and shorten the air gap between the teeth of the rotor 11 and the stator tooth 22', the magnetic reluctance will be reduced, causing a greater maximum magnetic flux and, consequently, a greater variation in magnetic flux with the passage of the rotor teeth. As a result, greater alternating voltage will be induced in the inducing coil 14' carried by the stator tooth 22'.

Figure 6A:
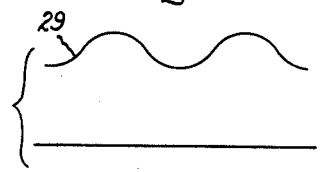
Figure 6B:
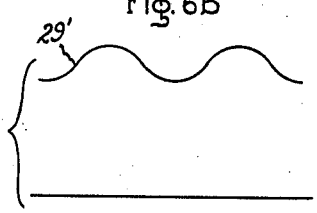

In case the shaft rotates eccentrically, alternating currents will also be induced in the coil 14' but the currents will be modulated at a frequency determined by the speed of the eccentric action of the shaft 11. The induced currents are represented by the high frequency sine waves in Fig. 4a and the modulation representing the speed of the eccentric action is represented by the envelope 29 enclosing the sine curve of Fig. 4a. The lower halves of the waves 28 are reversed by the rectifier 15 to produce a pulsating unidirectional current represented by the curve 30 in Fig. 5a, having an envelope 29 corresponding to the envelope 29 of Fig. 4a. The filters 16 smooth out the tooth-frequency pulsations represented by the curve 30 so as to leave only the envelope 29 in Fig. 6a representing the current flowing through the portion of the circuit including the conductor 31 in Fig. 2. The direct current component of the curve 29 in Fig. 6a is blocked out by the blocking voltage 18 so as to leave only the alternating current illustrated in Fig. 7a. The maximum or the effective value of the alternating current measured by the instrument 17 is accordingly a measure of the eccentricity of the shaft 11.

Figure 4B:
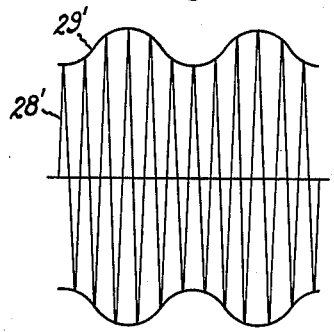
Figure 5A:
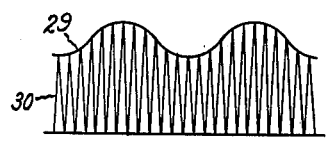
Figure 5B:
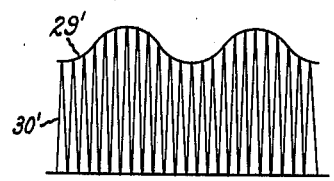

In case the shaft 11 should shift in its bearings but continue to rotate with the same eccentricity, the average value of the air gap at the tooth 22' would be either increased or decreased and, if it be assumed that the direction of shift is such as to decrease the average air gap at the tooth 22', the induced voltage will be increased as shown in Fig. 4b, in which the increased value of the induced current is represented by the curve 28' and the envelope of the curve by the curve 29'. The rectified high frequency current is represented by the curve 30' in Fig. 5b and the envelope by the curve 29' in Fig. 5b. It will be seen that the curves 6a and 6b will differ only in the height of the curve above the zero line representing the difference in shaft shift, whereas the amplitude of the alternating component of the current is the same in both curves.

Figure 7A:
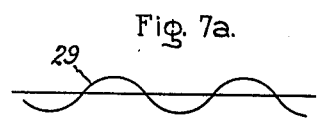
Figure 7B:
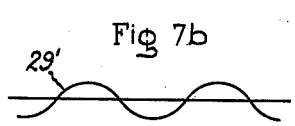

As illustrated in Fig. 7b, by eliminating the direct current component representing shaft shift, the alternating components of the curves 29 and 29' are found to be identical, representing equal shaft eccentricities under both conditions although the shaft shifts are different. If the switch 26 in Fig. 2 is moved to the lower position, disconnecting the potentiometer 24, 25 and shunting the instrument 17, by the resistor 26', the average value of the curve 29 or 29' of Fig. 6a or 6b will be measured, and a measure of shaft shift will be obtained. However, if the switch 26 is left in the upper position shown and the tap 25 is set at a suitable point to eliminate the direct current component of current, the currents represented in Figs. 7a and 7b will be measured and, for this purpose, an instrument responsive to alternating current only may be connected at 17 in order to measure eccentricity.

The relationship between eccentricity and shaft shift is illustrated diagrammatically in Fig. 8. When the shaft is in such an average position as to produce an average air gap of forty mils between the tips of the rotor teeth and the tip of the stator tooth 22', the induced voltage will be such as to produce an average current of fifty milliamperes, for example, in the current-responsive instrument 17. Cyclical variations in the air gap resulting from the eccentricity of rotation of the shaft 19 will produce cyclical variations in the current. For example, it may be assumed that positive and negative five-mil variations in the air gap will produce positive and negative variations of five milliamperes in the current.

If the shaft should shift in its bearings to such a position that the average air gap is only twenty mils, it will be apparent that flux crossing the air gap will increase and, consequently, greater current will be induced. The constants may be such, for example, that the average current increases to seventy milliamperes. Cyclical variations in the air gap resulting from the eccentricity of rotation of the shaft 19 will again produce cyclical variations in the current which will be substantially the same as before, for example, a five-mil variation in air gap will produce approximately a five-milliampere variation in current. It will be seen, therefore, that the reading of the direct current component of current will give an indication of the amount of shaft shift, whereas reading the alternating-current component will give a reading of the shaft eccentricity, which latter might be the same although the shaft shift changed.

The record produced by a strip chart recorder is illustrated in Fig. 9, showing the effect of change in shaft shift from forty to twenty mils without change in eccentricity. The upper portion of strip-chart record is produced with the switch 26 of Fig. 2 in its lower position, and the lower portion of the strip-chart record is produced with the switch 26 closed in the position shown in Fig. 2. The overage position of the record curve in the upper portion of the strip-chart record represents the shaft shift. In case the shaft speed becomes relatively high and a recording instrument is employed with a moving element having high inertia, the fluctuations in the curves 29 and 29' representing eccentricity will be smoothed out so that a reading of shaft shift only will be obtained. However, when the switch 26 is moved to the upper position shown in Fig. 2 so as to block out the direct current component of current, a reading of eccentricity only is obtained. It will be understood that, in producing the lower portion of the strip-chart record, the sensitivity of the instrument movement has been increased to make use of the full range of the strip-chart recorder. By using the coils of the winding 14 all around the stator, eccentricity movements in any direction will be recorded and a truer picture of eccentricity movements will be given. I have found that eccentricity indications are obtained with the coils of the winding 14 distributed all around the stator in spite of the fact that eccentric movement increases the air gap on one side of the rotor while decreasing on the opposite side and vice versa. The effect of decreasing the air gap more than counterbalances the effect of increasing the air gap on the other side, since the greater part of the magnetic flux naturally crosses the part of the air gap where its length is a minimum.

Although I have referred principally to shaft shift and to eccentricity, it will be understood that my apparatus is also useful in cases where the shaft does not have a regular eccentric movement, moving transversely once or twice each revolution, but moves irregularly. For example in the case of apparatus running on ball bearings, a defect in the bearing assembly or a broken ball might cause a very irregular transverse movement of the shaft, which was different each revolution. Such a condition would be indicated by the curves 29 and 29' produced on the record strip by the recording instrument or an oscillograph becoming irregular instead of regular and substantially sinusoidal as shown in Figures 4a to 9.

A modified construction of the stator is shown in Fig. 1 in which the stator consists of a ring 32 carrying two direct current windings 33 to form two poles having a plurality of teeth 34 thereon, each carrying a coil of an inducing winding corresponding to the inducing winding 14 of Fig. 2. In order to measure eccentricity in one direction independently of eccentricity in another direction, one of the coils, for example, the coil 35 may be connected to the transformer 23 when it is desired to measure eccentricity along the radius of a shaft in the direction of the coil 35 and another coil 36, located ninety degrees from the coil 35, may be connected when it is desired to measure eccentricity in the plane of vibration perpendicular to the first assumed plane of vibration. Likewise, the other coils may be connected when it is desired to measure eccentricity in other planes of vibration. However, preferably the coils are connected in series as shown in Fig. 2 to obtain a measure of the eccentricity and shaft shift on the horizontal plane of vibration and, to measure eccentricity in a perpendicular plane of vibration, the ring 32 is rotated ninety degrees in its support 27 to bring the axis of the poles formed by the windings 33 and 34 in the perpendicular instead of the horizontal direction.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. An eccentricity-responsive device for rotating shafts tending to vibrate transversely at a given frequency of vibration, said device comprising in combination with such a shaft, a magnetic detector unit having relatively movable magnetic core elements with an air gap between them, one of said elements being toothed, one of said elements rotating with said shaft, a current-conducting winding in inductive relation to said magnetic core elements, means for magnetizing said magnetic core elements, an instrument responsive to alternating current of the frequency at which the shaft tends to vibrate, said instrument being in electroresponsive relation to said winding, and means in circuit with said instrument for eliminating a direct current component of current.

2. A device for observing the transverse vibration of rotating shafts comprising in combination with a shaft, a magnetic detector unit having relatively movable magnetic core elements with an air gap between them, one of which elements rotates with said shaft, at least one of said elements being toothed, a current-conducting winding in inductive relation to said magnetic core elements, means for magnetizing said magnetic core elements, said magnetic core elements generating a relatively high frequency proportional to the speed of said shaft and the number of teeth in one of the elements and a lower frequency depending upon the vibration of the said shaft, and an alternating-current electrical instrument responsive only to such lower frequency and in electroresponsive relation with said detector unit winding.

3. Means for observing the transverse vibration of rotating shafts comprising a high frequency alternating-current generator having a toothed rotor attached to a shaft to be observed, and an electrical instrument responsive to alternating current of low frequency only connected to said generator.

4. A device responsive to the translatory component of transverse vibration of a rotating body having a cyclical component in its motion, said device comprising in combination, a toothed rotor to be attached to the body, the motion of which is to be studied, a stationary stator having teeth cooperating with said rotor teeth, a generating winding in inductive relation thereto, means for unidirectionally magnetizing said rotor and said stator, and an electrical instrument responsive to alternating currents of a low frequency corresponding to the frequency of vibration connected to said generating winding.

5. A device for observing the transverse vibration of rotating shafts comprising in combination with such a shaft, a magnetic detector unit, and an alternating-current measuring circuit selectively responsive to frequency of the same order of magnitude as the speed of shaft rotation, said detector unit comprising a pair of relatively rotatable magnetic core elements with an air gap between them, one of said elements being carried by said shaft, means for passing magnetic flux across the gap, and a generating winding in inductive relation to said core elements and connected to said measuring circuit, one of said core elements being toothed.

6. A device for observing the transverse vibration of rotating bodies comprising in combination, a magnet having a soft-iron pole piece carrying a generating winding, a toothed rotor to be connected to a rotating body, said magnet being supported in proximity to said rotor so as to form an air gap between said rotor and said pole piece, a rectifier connected to said winding, a filter connected to said rectifier, a current-responsive device connected to said filter, and means for eliminating direct current from said current-responsive device.

7. An eccentricity responsive device for rotating shafts comprising in combination, a vibration pick-up generating a relatively high frequency alternating current modulated with the frequency and amplitude corresponding to transverse vibration of the shaft being investigated, a rectifier having input terminals connected to said pick-up and having output terminals, filtering means connected to said output terminals, a current responsive device connected to said filtering means, an adjustable source of direct current adapted to be connected to said current responsive device in opposition to the current supplied thereto by said pick-up, and means for alternately connecting said adjustable source of blocking current to said current responsive device and shunting said current responsive device to decrease the sensitivity thereof.

8. An eccentricity device for rotating shafts comprising a voltage-generating vibration pick-up arranged for modulating a relatively high frequency alternating current with the frequency and amplitude corresponding to transverse vibration of such a shaft, a rectifier having input terminals connected to said pick-up and having output terminals, responsive means energized by said output terminals, and a source of direct current connected to said current responsive device to act in opposition to voltages supplied by said pick-up.

ALFRED V. MERSHON.